UNITED STATES PATENT OFFICE.

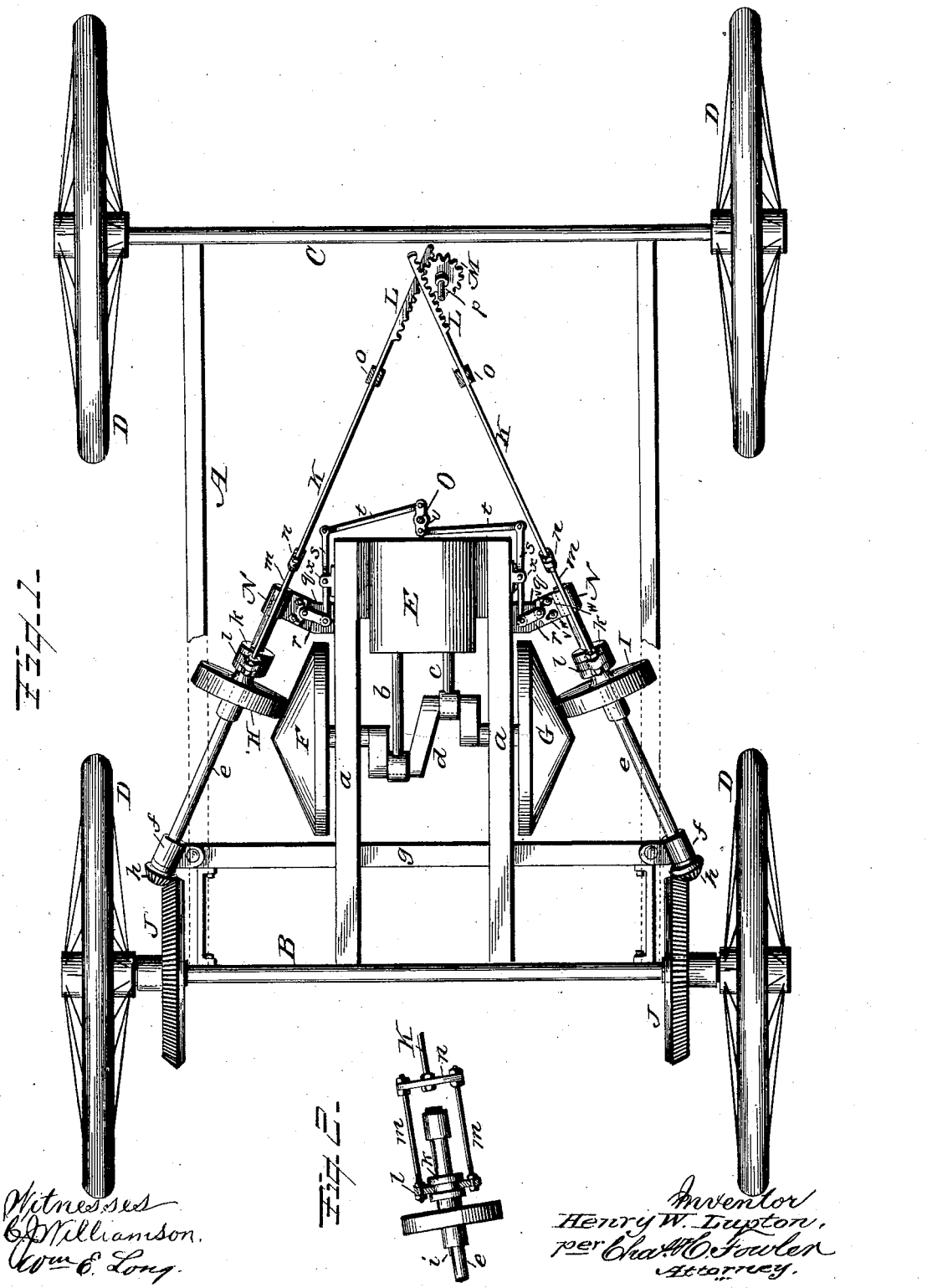

HENRY W. LUPTON, OF LOS GATOS, CALIFORNIA.

DRIVING-GEAR FOR MOTOR-VEHICLES.

SPECIFICATION forming part of Letters Patent No. 688,474, dated December 10, 1901.

Application filed October 24, 1901. Serial No. 79,795. (No model.)

*To all whom it may concern:*

Be it known that I, HENRY W. LUPTON, a citizen of the United States, residing at Los Gatos, in the county of Santa Clara and State of California, have invented certain new and useful Improvements in Driving-Gear for Motor-Vehicles; and I do hereby declare that the following is a full, clear, and exact description of the same, reference being had to the annexed drawings, making a part of this specification, and to the letters of reference marked thereon.

The present invention has for its object to provide a simple and effective driving-gear for motor-vehicles that will possess strength and durability and that can be easily controlled by the person seated in the vehicle, which objects I attain by the construction substantially as shown in the drawings and hereinafter described and claimed.

Figure 1 of the drawings is a top plan view of the frame of a motor-vehicle with the axles and wheels and showing my improved driving-gear applied thereto; Fig. 2, a detail view showing the friction-wheel and its connections.

In the accompanying drawings, A represents the frame of the motor-vehicle, which may be of any suitable form and construction and to which is connected the axles B C and the usual wheels D. To the parallel bars $a$ of the frame is connected in any suitable manner the usual cylinders (represented at E) for giving motion to suitable piston-rods $b$ $c$, which are connected to a double crank-shaft $d$, which has its bearings in the bars $a$. To the outer extremities of the double crank-shaft $d$ are suitably connected the driving-cones F G, which operate by frictional contact with the friction-wheels H I, the periphery of said wheels bearing with frictional contact against the surface of the cones nearer to or farther from the apex thereof to increase or diminish the speed. The friction-wheels H I slide upon the shafts $e$, which have their bearings in pivoted brackets $f$ upon the ends of a transverse bar $g$, suitably connected to the frame of the vehicle. The extremities of the shafts $e$ have pinions $h$, which engage gear-wheels J upon the axle B, whereby the rotation of the wheels thereon are controlled.

The friction-wheels H I, which are slidable upon the shafts $e$, are prevented from turning thereon by the feather $i$, as shown in Fig. 2 of the drawings.

The friction-wheels H I are provided with grooved hubs $k$, with which engage circular bands or rings $l$, and to these bands or rings are connected rods $m$, the opposite ends of said rods being connected to suitable heads $n$, and to these heads are secured the ends of rods K.

The construction above described provides simple means of forming a connection between the friction-wheel and the rod K, although any preferred means of connecting the friction-wheel and rod may be employed as found best adapted to the purpose. The rods K have their bearings in supports $o$, which are shown in section in Fig. 1 of the drawings, these supports being of any suitable construction found most preferable. The extremities of the rods K terminate in rack-bars L for engaging the teeth of a pinion M upon a shaft $p$, extending up within reach of the driver in the vehicle, so that by turning the shaft $p$ in the proper direction the periphery of the friction-wheels H I will be brought nearer to or farther from the apex of the cones F G, thereby increasing or diminishing the speed of the vehicle, as the case may be, with comparative ease.

To stop the vehicle by disengaging the friction-wheels H I from contact with the cones F G and disengaging the pinions $h$ from engaging the teeth of the gear-wheels J, there are provided slidable brackets N, which form the bearings for the extremities of the shafts $e$. These brackets N may be slidable in any suitable manner upon supports $q$. The means employed for enabling the brackets to be controlled consists in the pivoted links $r$, to which are pivoted the ends of levers $s$, and to the opposite ends of these levers are pivoted the levers $t$, which are connected to a link $u$. This link $u$ is rigidly connected to an upwardly-extending rod O, which rod is within reach of the driver, so that by turning the rod in the proper direction the friction-wheels H I and the pinions h will be engaged or disengaged from contact with the friction-cones and gear-wheels, respectively, thereby starting or stopping the vehicle, as found necessary.

I do not wish to be confined to any special means of connecting the brackets N to the supports q, as any suitable means may be employed so long as the brackets will be slidably connected to the supports, either by slots v and bolts w, as shown, or by any other means found most preferable, the levers s in the present instance being pivotally connected to clips x, which form supports for the levers.

Any suitable changes or modifications in the details of construction may be made in the invention without in any manner departing from the principle of the invention, and any such changes or modifications as would come within ordinary mechanical skill may be resorted to without affecting the essential features of the invention.

Having now fully described my invention, what I claim as new, and desire to secure by Letters Patent, is—

1. The combination with the frame of a motor-vehicle, of a driving-gear comprising suitable rotatable friction-cones, shafts connecting with the wheels of the vehicle to impart a rotatable motion thereto, friction-wheels adapted to engage the cones and slidable upon the shafts, and means for controlling the position of the friction-wheels with relation to the cones, consisting of rods with rack-bars and a rotatable pinion engaging the bars, substantially as and for the purpose specified.

2. The combination with the frame of a motor-vehicle, of a driving-gear comprising rotatable friction-cones, shafts connecting with the wheels of the vehicle to rotate the same, slidable friction-wheels upon the shafts to engage the friction-cones, and means for engaging or disengaging the friction-wheels from the cones, consisting of slidable brackets which form bearings for the ends of the shafts, and suitable means for operating the brackets, substantially as and for the purpose specified.

3. The combination with the frame of a motor-vehicle, of a driving-gear comprising rotatable friction-cones, gear-wheels engaging the wheels of the vehicle, rotatable shafts having their bearings in pivoted brackets and provided with pinions to engage the gear-wheels, friction-wheels adapted to engage the friction-cones and slidable upon the shafts, suitable means for controlling the position of the friction-wheels with relation to the friction-cones, and means for disengaging the pinions from the gear-wheels and the friction-wheels from the cones, consisting of slidable brackets which form the bearings for the shafts and suitable means for operating the brackets, substantially as and for the purpose set forth.

In testimony that I claim the above I have hereunto subscribed my name in the presence of two witnesses.

HENRY W. LUPTON.

Witnesses:
W. J. LEAN,
ROSE MAGUIRE.